United States Patent [19]
Chan et al.

[11] Patent Number: 5,771,344
[45] Date of Patent: Jun. 23, 1998

[54] COMPUTER SYSTEM WITH REMOTELY DUPLICATED AND DYNAMICALLY RECONFIGURABLE MEMORY

[75] Inventors: Wing Ming Chan, Pleasanton, Calif.; Wouter Senf, Blaricum, Netherlands; Timothy C. K. Chou, Palo Alto, Calif.; Mark H. Roettgering, Sunnyvale, Calif.; Nusret Yurutucu, Gilroy, Calif.; Craig F. Adams, San Jose, Calif.

[73] Assignee: Tandem Computers Incorporated, Cupertino, Calif.

[21] Appl. No.: 709,787

[22] Filed: Sep. 9, 1996

Related U.S. Application Data

[63] Continuation of Ser. No. 431,330, Apr. 27, 1995, abandoned.

[51] Int. Cl.⁶ .................................................. G06F 13/00
[52] U.S. Cl. ...................................................... 395/182.05
[58] Field of Search ........................ 395/182.04, 182.03, 395/182.02, 200.01, 200.02, 200.09, 182.05

[56] References Cited

U.S. PATENT DOCUMENTS

| | | | |
|---|---|---|---|
| 4,608,688 | 8/1986 | Hansen et al. | 371/11 |
| 4,707,823 | 11/1987 | Holdren et al. | 370/1 |
| 4,991,079 | 2/1991 | Dann | 364/200 |
| 5,051,887 | 9/1991 | Berger et al. | 364/200 |
| 5,210,865 | 5/1993 | Davis et al. | 395/575 |
| 5,269,011 | 12/1993 | Yanai | 395/425 |
| 5,272,558 | 12/1993 | Canestri et al. | 395/173 |
| 5,309,564 | 5/1994 | Bradby et al. | 395/200 |
| 5,335,352 | 8/1994 | Yanai et al. | 395/800 |
| 5,400,418 | 3/1995 | Pearson et al. | 385/11 |
| 5,422,772 | 6/1995 | Udd et al. | 359/119 |
| 5,434,994 | 7/1995 | Shaheen et al. | 395/508 |
| 5,495,570 | 2/1996 | Hengel et al. | 395/182.09 |
| 5,504,861 | 4/1996 | Crockett et al. | 395/182.11 |
| 5,513,314 | 4/1996 | Kandasamy et al. | 395/182.04 |
| 5,544,347 | 8/1996 | Yanai et al. | 395/489 |
| 5,572,352 | 11/1996 | Carbone, Jr. et al. | 395/177 |
| 5,574,950 | 11/1996 | Hathern et al. | 395/861 |

FOREIGN PATENT DOCUMENTS

| | | | |
|---|---|---|---|
| 0671686 | 9/1995 | European Pat. Off. | G06F 11/14 |
| WO94/25919 | 11/1994 | WIPO | G06F 12/16 |

Primary Examiner—Robert W. Beausoliel, Jr.
Assistant Examiner—Norman M. Wright
Attorney, Agent, or Firm—Townsend and Townsend and Crew

[57] ABSTRACT

First and second data processing systems located at first and second sites are configured with the first data processing system having a primary memory unit at the first site and a mirror memory unit at the second site with the first and second sites coupled by a single-mode optical fiber. Fiber optic switches at the first and second sites can be reconfigured to coupled the mirror disc to the second data processing system with minimal delay.

4 Claims, 6 Drawing Sheets

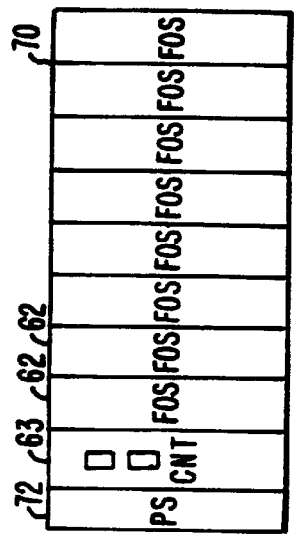
FIG. 6.
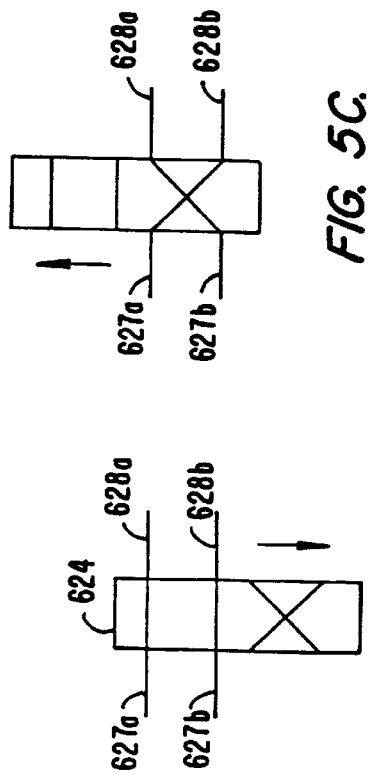
FIG. 5C.
FIG. 5B.
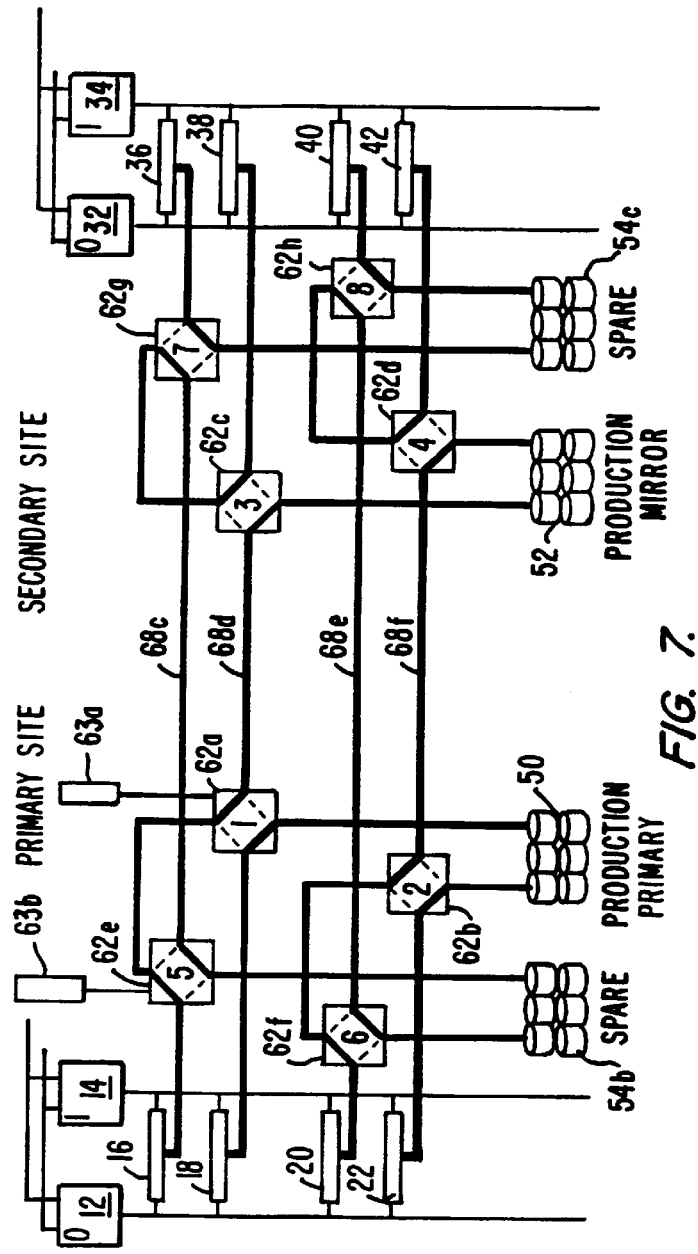
FIG. 7.

COMPUTER SYSTEM WITH REMOTELY DUPLICATED AND DYNAMICALLY RECONFIGURABLE MEMORY

This is a Continuation application No. 08/431,330, filed Apr. 27, 1995, now abandoned.

BACKGROUND OF THE INVENTION

1. Field of the Invention

The present invention relates generally to fault tolerant data processing systems and more particularly relates to system utilizing mirrored storage units to facilitate fault-tolerant operation.

2. Description of the Relevant Art

Generally, the degree of fault tolerance built into a data processing system and the choice of a particular fault tolerant implementation is the result of a cost/benefit analysis taking into account such factors as the cost of a system failure, the likelihood of a particular fault occurring, the cost of implementing the degree of fault tolerance necessary to prevent an occurrence of the particular fault from causing the system to fail, the amount of human intervention necessary and the amount of time required to recover from the fault for a particular fault tolerant implementation.

A basic requirement for fault tolerance is the preservation of data. The use of primary and mirror disc drives each coupled to an independent disc controller is a known technique for configuring a system to have no single point of failure. Such a system is utilized in the NonStop Computer manufactured and sold by Tandem Computers Incorporated and is depicted. Thus, for example if the single point of failure were the primary drive 50 the system could switch to the mirror drive 52 and continue operate.

In the system depicted in FIG. 11 the CPUs 12 and 14 and primary and mirror discs 50 and 52 are located at the same site. Thus, if the site were destroyed both the primary and mirror discs would be lost and the stored on the discs and transactions being processed by system would be lost. Additionally, the same problems result from the site becoming inaccessible as a result of, for example, bomb threats or road closures.

As computer systems become more critical to the operation of entire businesses or facilities the need for tolerance to the destruction of an entire data processing system, for example in the event of an earthquake or terrorist act, may be required. Many companies now have special departments to plan for disaster recovery.

SUMMARY OF THE INVENTION

The present invention is a fault tolerant data processing system that provides for complete and rapid recovery from the complete destruction of a primary data processing system and its associated data storage units.

According to one aspect of the invention, primary and secondary data processing systems are located at primary and secondary sites respectively. A primary memory unit, storing data and programs utilized by the primary system is located at the primary site and a mirror memory unit, mirroring the programs and data stored by the primary memory unit, is located at said secondary site. A single-mode fiber transmits data between said primary system and said mirror memory unit.

According to a further aspect of the invention, fiber optic switches are utilized to connect disc controllers in the primary and secondary data processing systems to the primary and mirror memory units. The switches can be flipped between first and second configurations by control signals received at a control input. In a first configuration of the switches the primary and mirror discs are coupled to disc controllers in the primary system and in a second configuration the discs are coupled to disc controllers in the secondary system. Thus, the secondary system can quickly be connected to the discs and take over the functions of the primary system.

According to a still further aspect of the invention, a fiber switch controller at the primary site has a control port coupled to the control input of a fiber switch and flips the switch between configurations in response to a command. The fiber switch controller has local and remote ports with the remote port accessible form outside the primary site. Thus, the fiber switch at the primary site can be flipped even if the primary site is inaccessible.

According to a still further aspect of the invention, additional fiber optic switches are provided to connect a spare disc as a mirror disc in the event that the mirror memory unit at the secondary system is inaccessible to avoid having the primary system operate without a mirror disc. Utilizing the switches makes recabling or changing the system image of the secondary system unnecessary.

According to a still further aspect of the invention, fiber switches can be utilized in a system network to controllably replace a primary system with a secondary system in the network. The replacement is transparent to the network.

Other features and advantages of the invention will become apparent in view of the following detailed description and appended drawings.

BRIEF DESCRIPTION OF THE DRAWINGS

FIGS. 5A–5C depict an embodiment of a fiber optic switch;

FIG. 6 is a block diagram of a rack including fiber switches and a switch controller;

FIGS. 7 and 8 are block diagrams depicting connection of a mirror disc after a system failure;

DESCRIPTION OF THE PREFERRED EMBODIMENT

The invention will now be described with reference to the preferred embodiments. In the figures, like or corresponding parts in the different views, will be given the same reference numbers.

Figure 1:
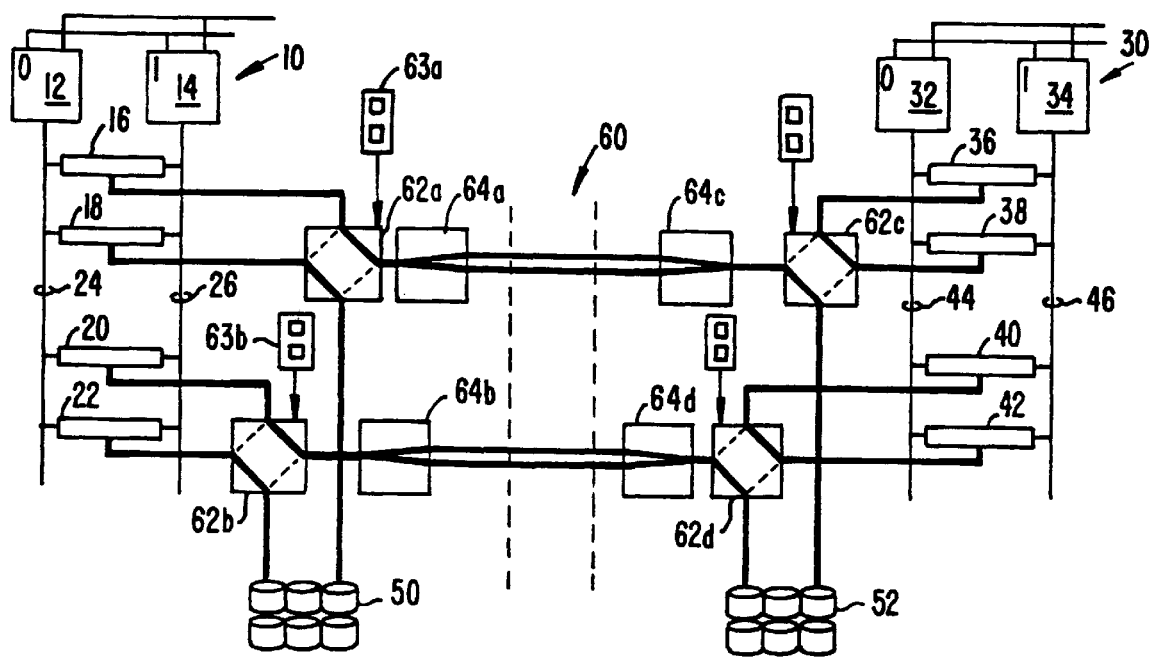
FIG. 1 is a block diagram of a preferred embodiment of the invention.

FIG. 1 is a block diagram of a preferred embodiment of the invention. The system depicted in FIG. 1 includes primary and secondary data processing systems located at primary and secondary sites with the primary site utilizing a primary disc local to the site and a remote mirror disc located at the secondary site. Multi-mode fibers are used for inter-site connections and a single-mode fiber connects the primary site to the remote mirror disc at the secondary site making possible a separation of 35 kilometers or more. Thus, a disaster at the primary site will not make its data inaccessible.

Additionally, fiber switches are provided so that, in the event that the primary site becomes inaccessible, the secondary site can immediately be connected to the mirror disc without recabling and take over the functions of the primary site with minimal delay.

In FIG. 1, a primary data processing system 10 includes first and second central processing units 12 and 14 and first, second, third, and fourth primary disc controllers 16, 18, 20 and 22 coupled to the central processing units 12 and 14 by first and second buses system 24 and 26. A secondary data processing system 30 is similarly configured and includes first and second central processing units 32 and 34 and first, second, third, and fourth secondary disc controllers 36, 38, 40 and 42 coupled to the central processing units 32 and 34 by first and second buses system 44 and 46.

The disc controllers of the primary and secondary systems are connected to discs 50 and 52 via an optical fiber/fiber switch network 60. In the remainder of the specification the term fiber should be read as a pair of fibers; one for sending signals and one for receiving signals. The fiber switches 62 each include top and bottom terminals and left and right contacts. The fiber switches 62 can be flipped between a first state, where the top terminal is connected to the right contact and the bottom terminal is connected to the left contact, and a second state, where the top terminal is connected to the left contact and the bottom terminal is connected to the right contact. In the drawings of the fiber switches 62, actual connections are drawn in black, alternate connections in gray.

Fiber switch controllers 63a–d are coupled to a control input of each fiber switch 62a–d, respectively. Control signals generated by the fiber switch controllers flip the fiber switches between the first and second states. These controllers 63 are described in greater detail below.

The optical fiber network 60 includes local fiber connections (multi-mode) and remote fiber connections (single-mode). The fiber switches 62 are used to switch multi-mode fiber connections and extenders 64 are used to couple multi-mode fibers to single-mode fibers. The extenders convert between multi-mode signals and single mode signals.

In practice, multi-mode fibers can be utilized for distances up to about two kilometers. This distance is determined by two factors:

attenuation of optical signals: There is a limit to the attenuation of the optical signal that can be tolerated at the receiving end. Extenders are used to extend this distance.

size of the FIFO buffer on the back-end board of the disc unit: The controllers send a stream of bits over the fiber cable, the data are received on a FIFO chip on the back-end board of the disc unit.

If the disc cannot keep up with writing data to the disc, the FIFO buffer will signal the controller to stop sending data when it is half full. The remaining half of the FIFO buffer must be large enough to accommodate the bits already underway during the time it takes for this signal, travelling at the speed of light, to reach the controller. Hence, this time determines the maximum distance. A larger FIFO buffer is needed to support longer distances.

First and second fiber switches 62a and b are located at the primary site 10 and third and fourth fiber switches 62c and d are located at the secondary site 30. All connections to the switch are in the form of multi-mode optical fibers.

At the primary site, the first fiber switch 62a has its top terminal coupled to the first primary disc controller 16, its bottom terminal coupled to the primary disc 50, its left contact coupled to second primary disc controller 18, and its right contact coupled to an extender first extender 64a. The second fiber optic switch 62b has its top terminal coupled to the third primary disc controller 20, its bottom terminal coupled to the primary disc 50, its left contact coupled to the third primary disc controller 22, and its right contact coupled to a second fiber extender 64b.

At the secondary site, the third fiber switch 62c has its top terminal coupled to the first secondary disc controller 36, its bottom terminal coupled to the mirror disc 52, its right contact coupled to a third extender 64c, and its left contact coupled to the second secondary disc controller 38. The fourth fiber switch 64d has its top terminal coupled to the third secondary disc controller 40, its bottom terminal coupled to the mirror disc 52, its left contact coupled to a fourth extender 64d, and its right extender coupled to the fourth secondary disc controller 42.

Figure 2A:
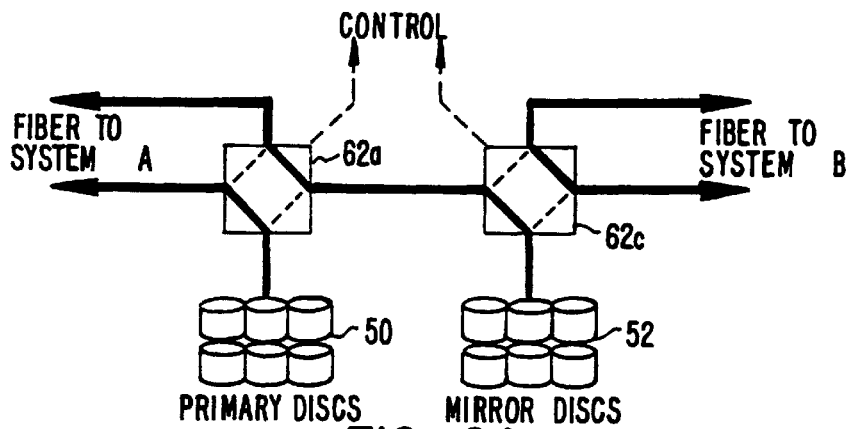
FIGS. 2A and 2B are schematic diagrams of fiber switches.
Figure 2B:
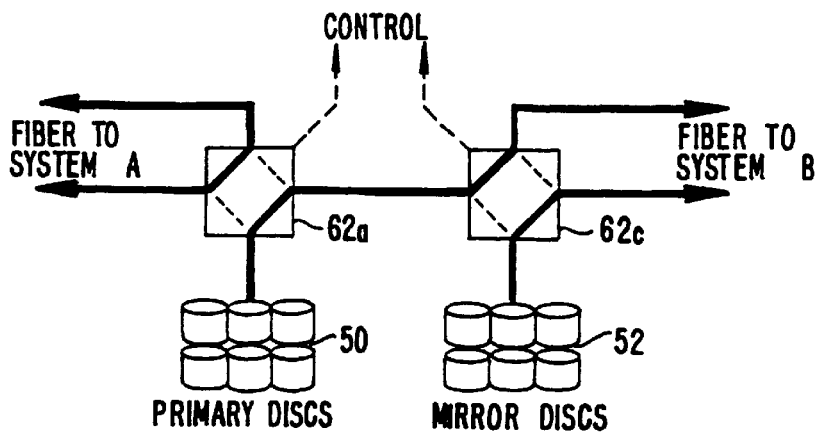

Referring to FIGS. 2A and B, the use of the fiber switches to physically switch the discs between two systems is depicted. In FIG. 2A, the first fiber switch 62a at the primary site and the second third fiber switch 62c at the secondary site are both in the first state and the disc controllers at the primary system are connected to the primary and mirror discs 50 and 52. In FIG. 2b, both fiber switches 62a and c have been flipped to the second state and the primary and mirror discs 50 and 52 are both connected to the disc controllers at the secondary site.

Referring back to FIG. 1, the first extender 64a at the primary site 10 and the third extender 64c at the secondary site 30 are coupled by a first single-mode fiber 68a and the second extender 64b at the primary at the primary site is coupled to the third extender at the secondary site 30 by a second single-mode fiber 68b. The single-mode fibers 68a and b have been tested to distances of 35 kilometers and thus the primary and secondary sites and the primary and mirror discs can be separated by at least that distance.

Figure 3:
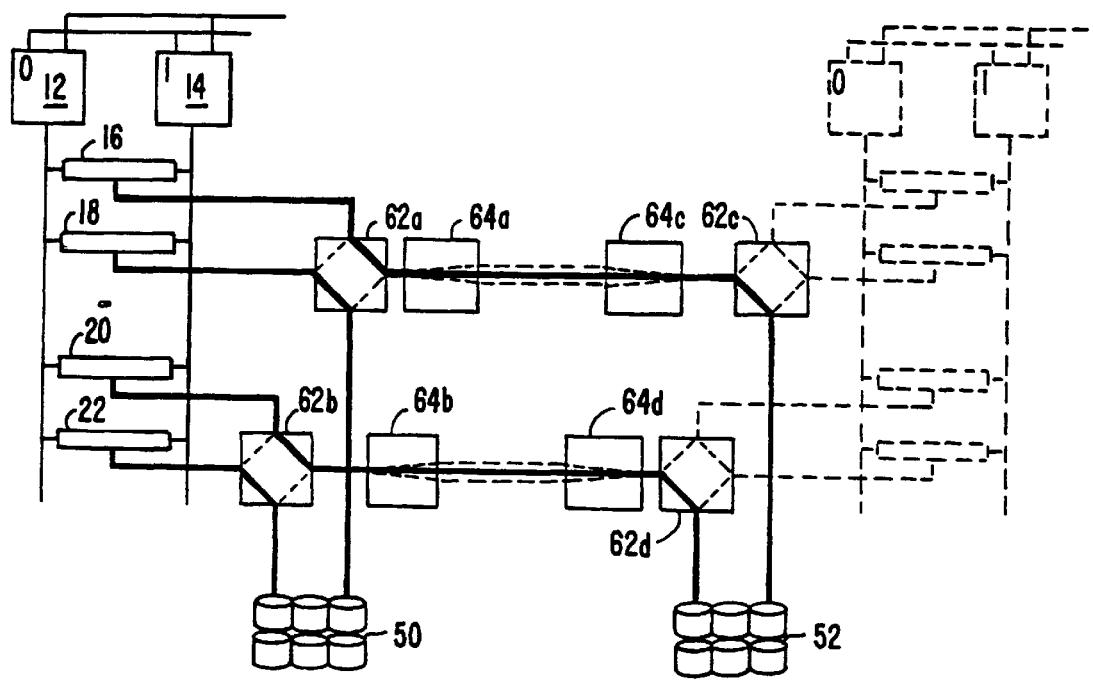
FIGS. 3 and 4 are block diagrams depicting the state of the system after flipping selected switches.
Figure 4:
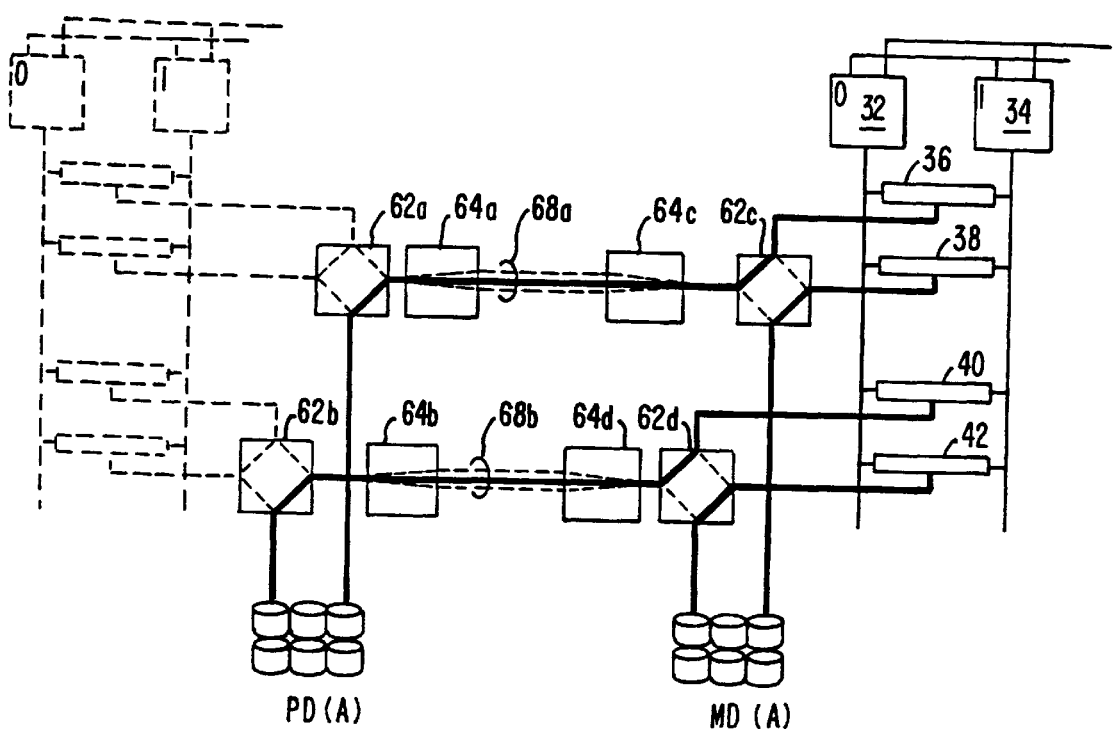

The switching of discs between the primary and secondary systems 10 and 30 are depicted in FIG. 3 and 4. In FIG. 3, all fiber switches are in the first state and second and fourth primary disc controllers 18 and 22 are connected to the primary disc 50 and the first and third primary disc controllers 18 and 20 are connected to the mirror disc 52. Note that while the secondary site 30 is depicted in shadow, all elements actually exist but are not connected to the primary and mirror discs 50 and 52.

In FIG. 4, the discs are switched to the secondary system. All fiber switches have been flipped to the second state and the first and third secondary disc controllers 36 and 40 are coupled to the primary disc 50 and the second and fourth secondary disc controllers 38 and 42 are coupled to the mirror disc 52.

Accordingly, in the embodiment depicted in FIG. 1, neither a disc controller, a fiber, a fiber switch, or an extender can act as a single point of failure to prevent either the primary or secondary systems 10 or 30 from accessing either the primary or mirror disc. For example, if the first fiber switch 62a were to fail, then the primary system would still have access to the primary disc 50 through the fourth primary disc controller 22 and the second fiber switch 62b and would have access to the mirror disc 52 through the third primary disc controller 20 and the second fiber switch 62b. Further, any disc or cabinet failure can be tolerated because the discs are mirrored at different sites; the discs will still be mirrored after a controller failure; the I/Os to each disc unit are distributed over two controllers thus eliminating a possible performance bottleneck; a single switch or controller failure will cause a path switch and will not make a disc inaccessible; and alternate routes for the fiber connecting the discs can be used thus increasing the reliability of the connection to the discs.

Further, the same single mode fiber, for example 68a, is used to connect the mirror disc 52 to the primary system 10 and to connect the primary disc 50 to the secondary system 30 to prevent access to any of the discs from both systems simultaneously.

Figure 5A:
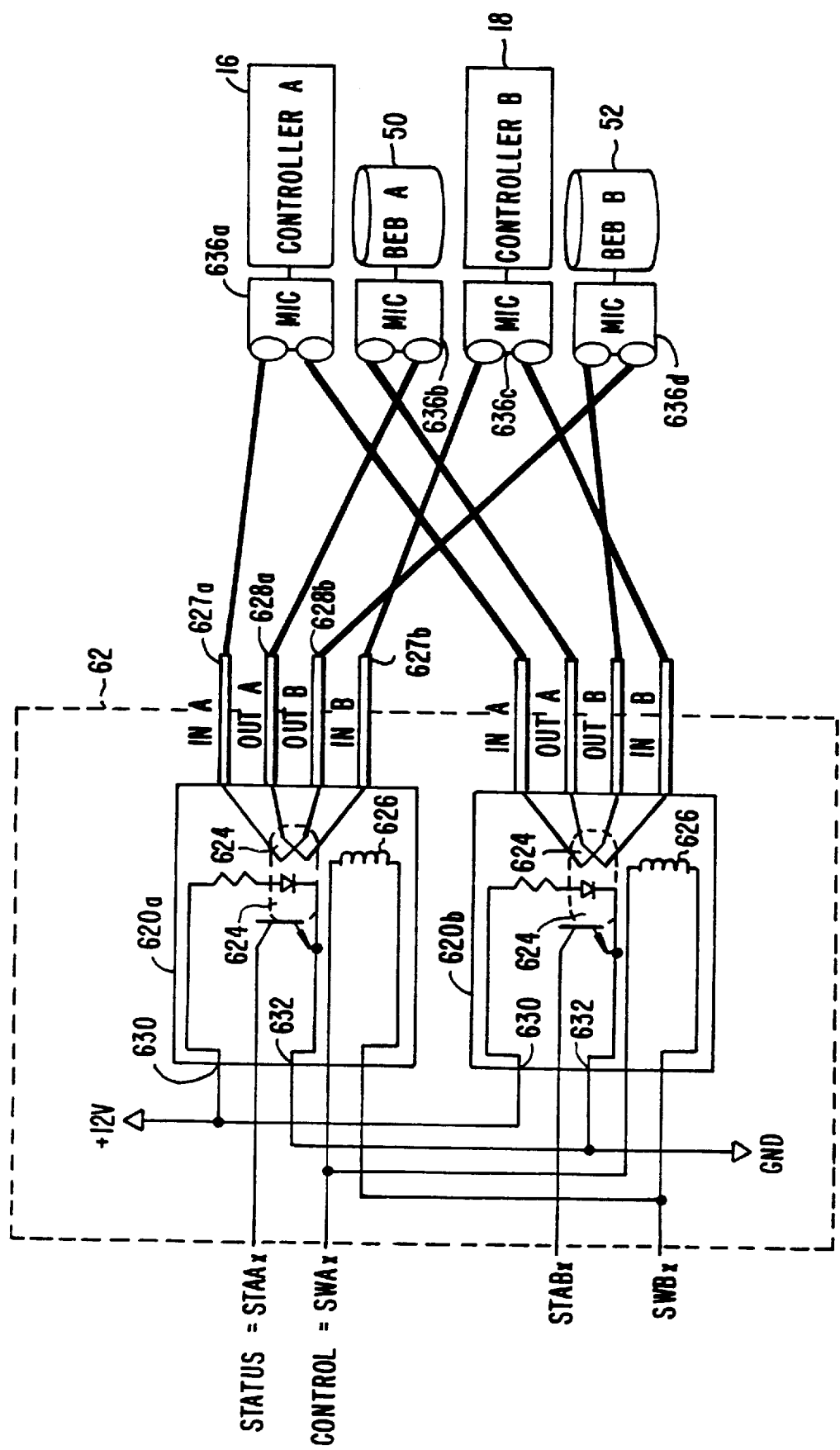

FIGS. 5A–15C depict an embodiment of the fiber optic switch 62. In FIG. 5A the fiber optic switch 62 includes two 2×2 component switches 620a and b such as the switches manufactured by DiCon FIBEROPTICS, INC. of Berkeley, Calif. Each component switch includes a optical proximity switch 622, to verify that switches change on command, coupled to a status output, a moving fiber platform 624 for flipping between the first and second states, a switch solenoid 626 coupled to a control port for controlling the position of the moving fiber platform, first and second I/O terminals 627a and b, first and second I/O contacts 628a and b, and power and ground contacts 630 and 632.

The control ports of the first and second component switches 620a and b are coupled to first and second control lines SWA and SWB and the status ports are coupled to first and second status lines STA and STB.

First, second, third, and fourth fiber optic connectors 636a–d function as I/O ports to a first disc controller 16, first disc drive 50, second disc controller 18, and second disc drive 52, respectively. The first terminal 627a is coupled to the first fiber optic connector 636a, the second terminal 627b is coupled to the third fiber optic connector 636c, the first contact 628a is coupled to the second fiber optic connector 636b, and second contact 628b is coupled to fourth fiber optic connector 636d.

FIGS. 5B and 5C schematically depict the operational concept of the moving fiber platform 624 to flip between the first and second states. In FIG. 5B the switch 62 in a first state where the first terminal 627a and first contact 628a are connected and the second terminal 627b and second contact 628b are connected. In FIG. 5C the switch 62 is in a second state where the first terminal 627a is connected to the second contact 628b and the second terminal is connected to the first contact 628a.

The moving fiber platform 624 changes position to flip the switch in response to a change of polarity of the control signal on the SW line. The component switch 620 is a latch style switch that requires a voltage difference to be maintained only when flipping the states.

Thus, referring back to FIG. 5A, the component switches 620a and b are in the second state and connect the first disc controller 16 to the second disc 52 and the second disc controller 18 to the first disc 50. If the switch components were flipped to the first state then the first disc controller 16 would be connected to the first disc 50 and the second disc controller 18 would be connected top the second disc 52.

Two component switches 620a and b and dual fiber connections are utilized to increase fault tolerance and eliminate the switch components 620, fibers, or fiber connectors 636 from being single points of failure.

As described above, the fiber switches are used to switch multi-mode fiber cables. The switches are passive devices, i.e., when the switches are powered off, they remain in their current state. In the preferred embodiment, as depicted in FIG. 6, up to eight switches are packaged in one 19-inch rack 70 unit containing a power supply 72, a switch controller 63, and up to eight fiber optic switches 62. Each switch 62 in the rack unit 70 is fed from both power supplies and will work even if one power supply fails or is deliberately taken out. The switches 62 are controlled externally via an RS-232 lines from the switch controller 63 that is shared between all the switches in the unit.

The switch controller has two communication ports, local and remote 630L and R, to provide better fault reliance. In the system depicted in FIG. 1, the switch controller 63 at the primary site 10 could have its local port 630L accessed at the primary site and the remote port 630R accessible by modem. Thus, if the primary system had crashed, the switch controller 63 could be accessed via modem to switch the fiber switches 62 to make the discs at the primary site 10 accessible to the alternate site 30.

Additionally, a typical system has several rack units 70 and the critical switches 62 are located in different rack units 70 so that one rack unit 70 will not be a single point of failure.

The switch controller 63 responds to only to a valid switch command which may be provided at either the remote or local port 630L or R.

As depicted, for example, in FIG. 4, if the primary site is completely inaccessible, then the secondary site could take over its function utilizing the mirror disc 52 located at the secondary site. However, the disc would no longer be mirrored. For those rare cases where a complete site cannot be used the fiber switches can be utilized to prevent running with unmirrored discs.

FIG. 7 depicts a system where both the primary and secondary sites 10 and 30 include spare discs 54b and c. These spare discs can be used under normal circumstances by applications with lower availability requirements. In case of a site failure, these applications need to give up access to the discs or must continue running with non-mirrored discs.

In FIG. 7 the extenders are not depicted to simplify the figure. During normal operation the production discs 50 and 52 are normally driven the primary site 10 and the spare discs 53s and p are from the secondary site 30.

The first and second fiber optic switches 62a and b at the primary site have their lower terminals coupled to the primary disc 50 and couple the second and fourth primary disc controllers 20 and 22 to the primary disc 50 when the switches 62a and b are in the first state. Similarly, the third and fourth fiber optic switches 62c and d at the secondary site have their terminals coupled to the mirror disc and couple the first and third primary disc controllers 16 and 20 to the mirror disc when the switches are in the first state. However, fifth and sixth fiber optic switches 62e and f at the primary site and sixth and seventh and eighth fiber optic switches 62g and h at the secondary site are added to allow reconfiguration at the physical level.

The first primary disc controller 16 is coupled to the mirror production disc 52 at the secondary site via fifth, first, and third fiber switches 62e, a, and c and the second single mode fiber 681; the second primary disc controller is coupled to the primary production disc 50 via the first fiber switch 62a; the third primary disc controller 20 is coupled to the mirror production disc 52 via the sixth, second, and fourth fiber switches 62f, b, and d and the fourth single-mode fiber 68f; and the fourth primary disc controller 32 is coupled to the production primary disc 50 via the second fiber switch 62b.

The first and third secondary disc controllers 36 and 40 are respectively coupled to the spare disc 53s at the secondary site via the seventh and eighth fiber switches 62g and h. The second secondary disc controller 38 is coupled to the spare disc 53p at the primary site 10 via the third, seventh, and fifth fiber switches 62c, g, and e and the first single-mode fiber 68c; and the fourth secondary disc controller 42 is coupled to the spare disc 52p at the primary site via the fourth, eighth, and sixth fiber switches 62d, h, and f and the third single-mode fiber 68e.

Note that in the normal situation, depicted in FIG. 7, the first, second, third, and fourth fiber switches 62a, b, c, and d are in the first state and the fifth, sixth, seventh, and eighth fiber switches 62e, f, g, and h are in the second state.

It would be possible to simplify and reduce the costs of the system depicted in FIG. 7 by not installing the first and third single mode fibers 68c and e; however, without those fibers the spare disc 53p at the primary site 10 cannot be accessed by the secondary site 30. Thus, failures of the spare disc 53p might not be noticed.

In the preferred embodiment, one, or several, system images including the connections of peripherals such as discs are stored in the system. For example, in the system depicted in FIG. 7 the system image at the primary site has the first and third primary disc controllers 16 and 20 coupled to the mirror disc 52 and the second and fourth disc controllers 18 and 22 coupled to the primary discs 50.

If the configuration of the system is to be changed from one stored image to another a "cold load" is performed which requires restarting all applications and which takes the system off line for a period of time.

The first way of preventing running with unmirrored discs is to physically replace discs from the failed system with spare discs. The spare discs can be connected by re-cabling the discs or by adding fiber switches. FIG. 7 is an example of a technique utilizing additional fiber switches.

Figure 8:
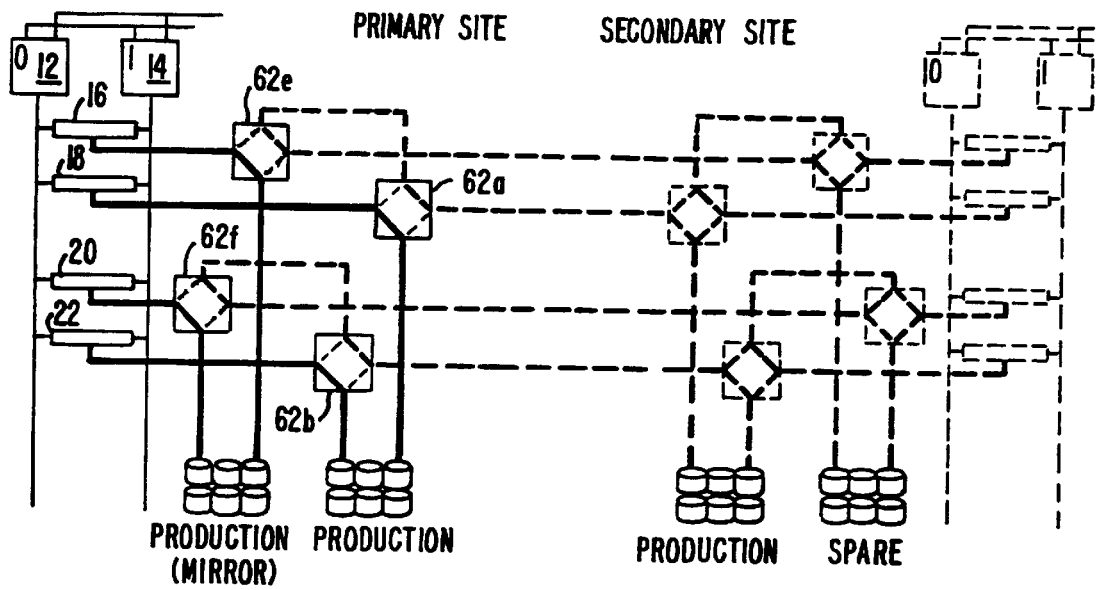

FIG. 8 depicts the configuration of the system of FIG. 7 after the complete loss of the secondary site. In FIG. 8 the fifth and sixth fiber switches 62e and 62f have been flipped from the second state to the first state and the first and third primary disc controllers are connected to the spare disc 53p at the primary site. Then, the data on the spare disc 53p at the disc 53p at the primary site can be backed on another disc (not shown) and the data from the primary disc 50 can be copied to the spare disc 53p while the system is on line.

Note that the system image at the primary site 10 need not be changed because from the systems point of view the primary disc controllers are still performing the same functions even though the physically the mirroring disc has been changed from the production disc 52 at the secondary site to the spare disc 53p at the primary site. Thus, the physical fiber switches 62 allow reconfiguring the actual discs at a lower physical level than the logical system image level.

Figure 9:
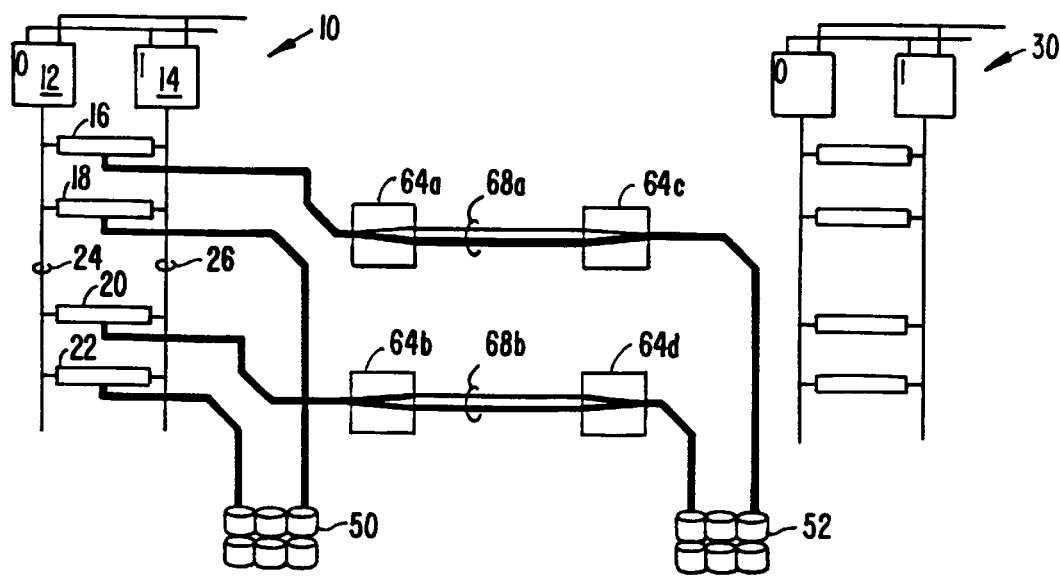
FIG. 9 is a block diagram of a system having no fiber switches.

FIG. 9 is a block diagram of an embodiment that does not utilize fiber switches. In the event of an even causing the primary site 10 to be inaccessible, the mirror disc 52 at the secondary site will still be accessible. However, the mirror disc must be manually connected to the disc controllers at the secondary site 30.

Additionally, referring back to FIG. 1, it is possible to utilize only single paths to the primary and mirror discs 50 and 52 instead of the dual paths depicted. However, in that case, the failure of a fiber optic switch, disc controller, or the single mode fiber would cause the remote disc to become unavailable. The advantage of having the mirror disc 52 at a remote location would still be realized.

Figure 10:
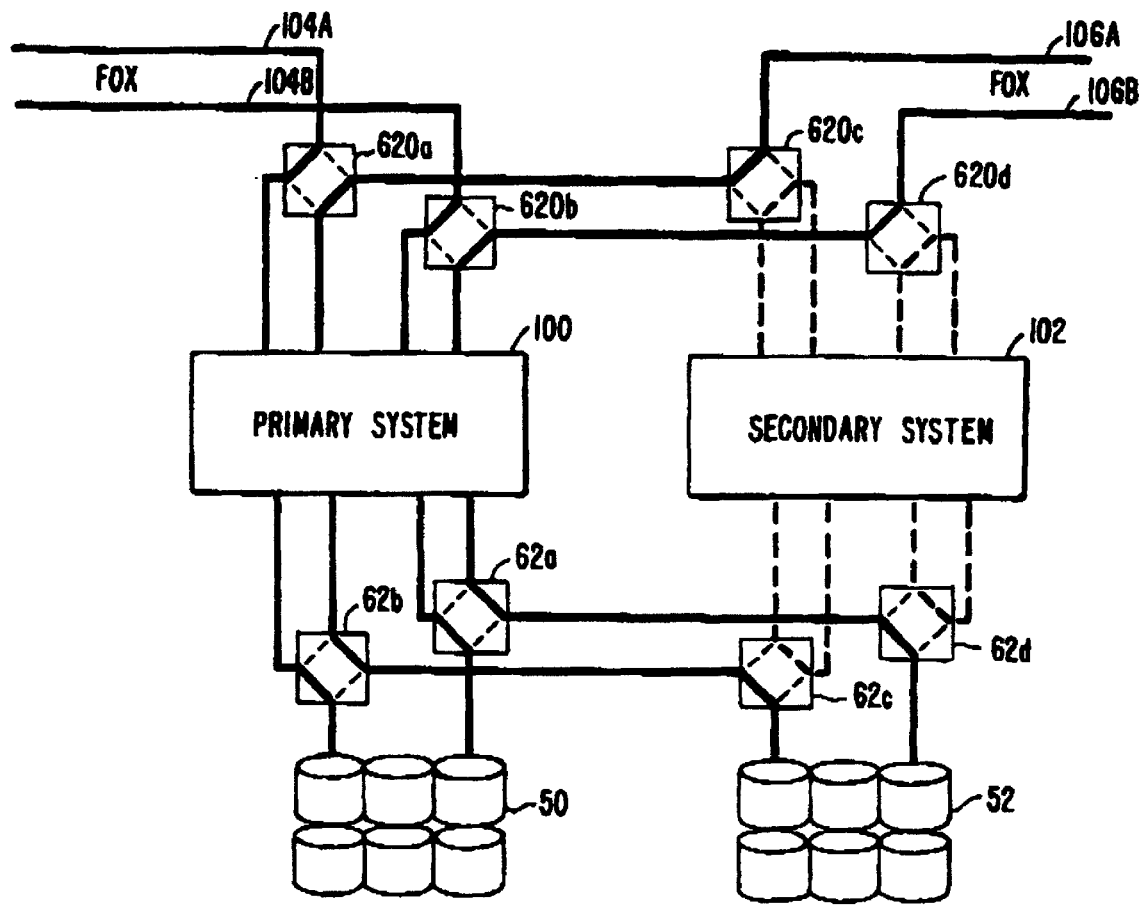
FIG. 10 is a block diagram of an alternative embodiment.
Figure 11:
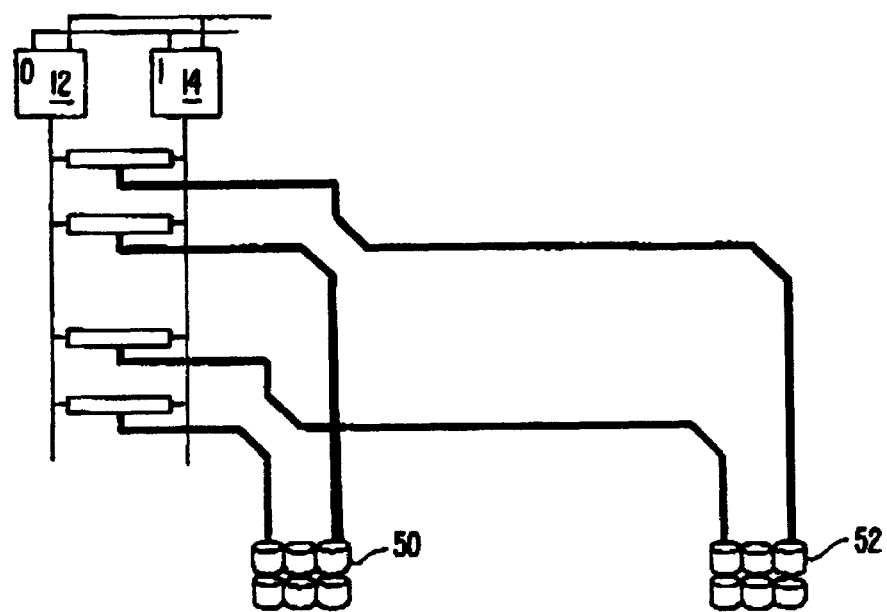
FIG. 11 is a block diagram of a prior art system.

FIG. 10 is a block diagram illustrating the principles of the invention applied at a network level. In FIG. 10, the primary system 100 is coupled to a communication network by first and second input fibers 104A and B, first and second output fibers 106A and B, and first and second network fiber switches 620a and b. If the first and second network fiber switches were flipped to the second state then the secondary system 102 would be connected the network.

The two systems 100 and 102 do not participate in the network simultaneously. This makes it possible to give both systems the same name and number. It is then completely transparent to other components in the network whether the primary or the secondary system is used. Thus, the network fiber switches 620 allow reconfiguring the network at lower physical level than the logical network configuration.

Additionally, as depicted in FIG. 10, the primary and mirror discs may be switched between the primary and secondary systems 100 and 102 as described above.

The invention has now been described with reference to the preferred embodiments. Alternatives and substitutions will now be apparent to persons of skill in the art. Accordingly, it is not intended to limit the invention except as provided by the appended claims.

What is claimed is:

1. A fault tolerant computing system comprising:

a primary data processing system located at a primary site;

a first and second primary memory controllers, each having an I/O port, for transferring data between said primary data processing system and a memory unit coupled to said I/O port;

a secondary data processing system located at a secondary site;

a first and second secondary memory controllers, each having an I/O port, for transferring data between said secondary data processing system and a memory unit coupled to said I/O port;

a primary memory unit, located at said primary site, for storing programs and data utilized by said primary data processing system;

a mirror memory unit, located at said secondary site, for storing the programs and data stored by said primary memory unit;

a single-mode optic fiber having a first terminal at said primary site and a second terminal at said primary site;

a primary fiber optic extender, located at said primary site and having multi-mode and single-mode ports, with said single mode port coupled to the first terminal of said single mode fiber;

a secondary fiber optic extender, located at said secondary site and having multi-mode and single-mode ports, with said single mode port coupled to the second terminal of said single mode fiber, with said fiber optic extenders for converting between single-mode and multi-mode signals;

first and second fiber optic switches, each having a first terminal, a second terminal, a first contact, and a second contact, with each switch configurable in either a first configuration, where the first terminal is connected to the first contact and the second terminal is connected to the second contact or a second configuration where the first terminal is connected to the second contact and second terminal is connected to the first contact each switch also having a control input for receiving a control signal to control the configuration of the switch;

said first fiber optic switch, located at said primary site, having its first terminal coupled to the first primary memory controller, its second terminal coupled to coupled to said primary memory unit, its first contact coupled to the multi-mode port of said primary fiber optic extender by a first multi-mode fiber, and its second contact coupled to said second primary memory controller;

said second fiber optic switch, located at said second site, having its first terminal coupled to said first secondary memory controller, its second terminal coupled to said mirror memory unit, its first contact coupled to said second secondary memory controller, and its second contact coupled the multi-mode port of said secondary fiber optic extender by a second multi-mode fiber;

a primary switch controller, located at said primary site and having a local control input port for receiving a command and a control output coupled to the control input of said first fiber optic switch, for flipping said first switch from one configuration to another configuration when a command is received;

a secondary switch controller, located at said secondary site and having a local control input port for receiving a command and a control output coupled to the control input of said second fiber optic switch, for flipping said second switch from one configuration to another configuration when a command is received so that the primary and mirror memory units can be accessed from either site by flipping the state of said switches and the mirror memory system can be accessed from the secondary site if the primary site is inaccessible.

2. The computing system of claim 1 wherein said primary switch controller further includes:
a remote control input port that can receive commands from locations external to said primary site.

3. A computer network comprising:
a primary computing system having network input and output ports;
a secondary computing system having network input and output ports;
a network input fiber for providing data from said network;
a network output fiber for providing data to said network;
first and second fiber optic switches, each having a first terminal, a second terminal, a first contact, and a second contact, with each switch configurable in either a first configuration, where the first terminal is connected to the first contact and the second terminal is connected to the second contact or a second configuration where the first terminal is connected to the second contact and second terminal is connected to the first contact each switch also having a control input for receiving a control signal to control the configuration of the switch;
said first fiber optic switch having its first terminal coupled to the network input fiber, its second terminal coupled to the network output port of said primary computing system, its first contact coupled to the second contact of said second fiber optic switch, and its second contact coupled to the network input said primary computer system;
said second fiber optic switch having its first terminal coupled to the network output fiber, its second terminal coupled to the network input port of said secondary computing system, its first contact coupled to the network output port of said secondary computing system, and its second contact coupled the first contact of said first fiber optic switch;
a switch controller, having a local control input port for receiving a command and a control output coupled to the control inputs of said first and second fiber optic switches, for flipping said first and second switches from one configuration to another configuration when a command is received to connect either said first computing system or said second computing system to said network under control of said command.

4. A fault tolerant computing system comprising:
a primary data processing system located at a primary site;
a first and second primary memory controllers, each having an I/O port, for transferring data between said primary data processing system and a memory unit coupled to said I/O port;
a secondary data processing system located at a secondary site;
a first memory controller, having an I/O port, for transferring data between said secondary data processing system and a memory unit coupled to said I/O port;
a primary memory unit, located at said primary site, for storing programs and data utilized by said primary data processing system;
a mirror memory unit, located at said secondary site, for storing the programs and data stored by said primary memory unit;
a spare memory unit located at said primary site;
a single-mode optic fiber having a first terminal at said primary site and a second terminal at said primary site;
a primary fiber optic extender, located at said primary site and having multi-mode and single-mode ports, with said single mode port coupled to the first terminal of said single mode fiber;
a secondary fiber optic extender, located at said primary site and having multi-mode and single-mode ports, with said single mode port coupled to the second terminal of said single mode fiber, with said fiber optic extenders for converting between single-mode and multi-mode signals;
first, second and third fiber optic switches, each having a first terminal, a second terminal, a first contact, and a second contact, with each switch configurable in either a first configuration, where the first terminal is connected to the first contact and the second terminal is connected to the second contact or a second configuration where the first terminal is connected to the second contact and second terminal is connected to the first contact each switch also having a control input for receiving a control signal to control the configuration of the switch;
said first fiber optic switch, located at said primary site, having its first terminal coupled to the first terminal of said third fiber optic switch, its second terminal coupled to coupled to said primary memory unit, its first contact coupled to the multi-mode port of said primary fiber optic extender by a first multi-mode fiber, and its second contact coupled to said second primary memory controller;
said second fiber optic switch, located at said secondary site, having its second terminal coupled to said mirror memory unit, its first contact coupled to said second secondary memory controller, and its second contact coupled the multi-mode port of said secondary fiber optic extender by a second multi-mode fiber;
said third fiber optic switch, located at said primary site, having its first terminal coupled the first terminal of said first fiber optic switch, its second terminal coupled to said spare memory unit, and its first contact coupled to said first primary memory controller;

a first primary switch controller, located at said primary site and having a local control input port for receiving a command and a control output coupled to the control input of said first fiber optic switch, for flipping said first switch from one configuration to another configuration when a command is received;

a second primary switch controller, located at said primary site and having a local control input port for receiving a command and a control output coupled to the control input of said third fiber optic switch, for flipping said third switch from one configuration to another configuration when a command is received, the mirror memory system can be accessed from the secondary site if the primary site is inaccessible, and the spare disc can be utilized as a mirror memory unit by flipping the state of said third switch.

* * * * *